Patented Jan. 2, 1934

1,942,201

UNITED STATES PATENT OFFICE 1,942,201

PROCESS FOR THE PRODUCTION OF RESINS

Edwin L. Cline, Philadelphia, Pa., assignor to The Barrett Company, New York, N. Y., a corporation of New Jersey No Drawing. Application May 20, 1931
Serial No. 538,865

24 Claims. (Cl. 260—7)

My invention relates to production of resins and particularly to the production of light colored resins from oils containing polymerizable constituents of the coumarone-indene type.

Heretofore, in the production of resins commonly known as paracoumarone resins, it has been found that some of the constituents of the oils when polymerized form substances which darken the resin and greatly reduce its value.

It is found further that certain crude naphthas produce only dark colored resins. The processes heretofore employed for the production of light colored paracoumarone resins in many instances involve reactions which are difficult to control, so that the process must be carried out with extreme care in order to avoid large losses of resin-forming materials.

It is an object of my invention to provide a new and improved process for treating oils containing polymerizable constituents and especially constituents of the coumarone-indene type whereby the resulting product is light in color and of high commercial value.

Another object of my invention is to provide a process which is easily controlled and which may be employed for producing light colored resins from oils which have heretofore yielded only dark colored resins.

A further object of my invention is to treat oils preparatory to polymerization in such manner that the resin-darkening constituents of the oils are modified so that subsequent polymerization of constituents of the oil results in the formation of light colored resin.

These and other objects and features of my invention will appear from the following description thereof.

My invention is applicable to the treatment of oils which contain organic polymerizable constituents and particularly constituents of the coumarone indene type, including those oils which have heretofore yielded only dark colored resins. My invention is particularly applicable to the treatment of distillates from coal and coal tar such as crude naphtha and heavy benzols. Such oils are commonly known to the trade as paracoumarone crudes.

In carrying out my invention, I treat the oil with litharge preferably by heating or refluxing the oil in the presence of a small amount of litharge, for example 5% or less. After refluxing for about one hour, the litharge is allowed to settle and the treated oil decanted. The oil is then distilled and the distillate coming over at temperatures up to about 200° C. and not exceeding about 210° C. is collected and polymerized with any suitable polymerizing agent such as strong sulfuric acid with the usual suitable precautions. The product resulting from the treatment as heretofore described, is a light colored paracoumarone resin particularly suited to the production of high grade varnishes and for use wherever coumarone resins are employed.

I have also found that when oils that have been given a pre-treatment with litharge as described above, are subsequently heated, refluxed or distilled in the presence of an alkaline material, the resulting product is even lighter in color than that produced when the litharge treatment is employed alone. My invention therefore comprises a combination of process steps in which the oil is first given a treatment with litharge and subsequently the treated oil is distilled in the presence of an alkaline material.

I have also found that the color of the resin produced by polymerization of constituents of oils can be improved by subjecting the oil after treatment with litharge to distillation under vacuum prior to the polymerization treatment. My invention therefore comprises the treatment of oil containing polymerizable constituents of the coumarone-indene type with litharge in combination with any other suitable treatment of the oil prior to polymerization for further improving the color of the resins produced.

As a specific example of my invention in which oil is treated with litharge, the following example is cited: Crude coal tar naphtha containing polymerizable constituents of the coumarone-indene type and having a preferred boiling point range of about 140° C. to 200° C. and within the limits of 135° C. and 230° C. is freed from phenols and pyridine bases, for example, by successive treatments with caustic soda and sulfuric acid followed by water washes in the usual manner. The oil freed from phenols and pyridine bases is refluxed for about one hour with 3% by weight of litharge, due provision being made to prevent the loss of volatile constituents of the naphtha. The naphtha is then allowed to cool and the litharge settles therein, the treated naphtha being decanted and distilled. About 80 to 85% of the treated naphtha distills over at temperatures up to about 200° C. and not exceeding 210° C. and this distillate is collected for polymerization. If the distillation of the treated oil is carried out under reduced pressure (advantageously under a vacuum of about 25 inches of mercury or better), the temperature at which the distillate collected comes over is correspondingly lower.

After distillation, an amount of refined naphtha, from which substantially all of the polymerizable constituents have been removed, equal to about one-half the volume of the distillate is added to the distillate as a diluent material to reduce the concentration of the polymerizable constituents present in the product prior to polymerization. The diluted naphtha is then polymerized in any suitable manner as by treatment with 66° Bé. sulfuric acid at temperatures below 20° C. or by the use of other polymerizing processes and agents with suitable precautions. The naphtha after polymerization is neutralized, washed and the volatile constituents distilled off. This distillation may be effected in an ordinary pot still, or in a tube still, by heating the oil with or without vacuum, or by steam distillation under atmospheric or reduced pressure, etc.

In carrying out the process as described above, the loss of polymerizable constituents of the naphtha is comparatively small, about 82 to 88% of the total polymerizable constituents of the naphtha treated being obtained as light colored, high grade paracoumarone resin.

In a modification of my process the naphtha or oil after being treated with litharge is given a further treatment with an alkaline material to obtain resins that are even lighter in color than when treated with litharge alone. Various alkaline materials may be employed for this purpose, such as caustic soda, caustic potash, alkali silicates, alkali carbonates and certain organic bases such as triethanolamine, etc. As an example of such further treatment in which the oil is distilled in the presence of caustic soda, the treated naphtha in the foregoing example is separated from the litharge and about 2.6% by weight of a 20% solution of caustic soda is added to the treated naphtha. The naphtha is then distilled in the presence of the alkali and the distillate coming over at temperatures up to about 200° C. is collected and polymerized, as described above, or in any other desired manner. The product obtained in carrying out the process modified in this respect is even lighter in color than that produced when the oil is treated with litharge alone or is distilled in the presence of alkaline material without having been given a pre-treatment with litharge.

In a further modification of my process the oil after having been treated with litharge is subjected to distillation under vacuum. For example Carbolic Oil Crude Hiflash (a crude coal tar naphtha distilled from carbolic oil at least partially freed of tar acids and having a specific gravity of about .87 to .93 at 25° C., and with a distillation 10% point of about 160° C., a 90% point of about 200° C., and an End point of about 220° C.) was refluxed for about one hour with an amount of litharge equal to about 3% by weight of the oil. The litharge was allowed to settle in the oil and the oil separated and treated to remove tar acids and pyridine bases therefrom. The treated and extracted oil was then subjected to distillation under a vacuum of about 25 inches of mercury. It is desirable to obtain the distillate free from solid naphthalene and in the example cited the distillation was therefore stopped when the vapor temperature was about 145° C. The resin produced by polymerization of the distillate thus obtained was as light in color as the product obtained when the oil after treatment with litharge was distilled under atmospheric pressure and in the presence of caustic soda and was lighter in color than the product produced by polymerization of the oil after treatment with litharge alone.

In carrying out my invention, the amount of litharge employed and the length of time of treatment and the temperature to which the oil is heated in the presence of the litharge may be varied. However, I have found there is comparatively little improvement in the color of the final product effected by increasing the amount of litharge employed, or the temperature or length of time of treatment beyond those set forth above. Although I have found that there is some improvement in color obtained by more extended treatment of the oil, the yield of light colored resin obtained is thereby decreased.

The treatment is not necessarily applied to crudes from which tar acids and bases have been removed. Very effective results may be obtained by refluxing crudes with litharge prior to the removal of tar acids and pyridine bases from such crudes. The use of caustic soda in subsequent removal of tar acids will then supplement the beneficial effect of the litharge treatment in a somewhat similar way to that in which the treatment by caustic soda outlined in the second example above improves the effect produced by the litharge treatment.

Although I have described particular methods of carrying out my process, the invention may be varied considerably and therefore I do not intend that the invention should be limited by the specific examples cited except as defined by the claims.

I claim:

1. In the process of producing resin from oils containing organic polymerizable constituents, the step which comprises treating the oil with litharge.

2. In the process of producing resins from oils containing polymerizable constituents of the coumarone-indene type, the step which comprises heating the oil with litharge.

3. In the process of producing resins from oils containing polymerizable constituents of the coumarone-indene type, the step which comprises refluxing the oil in the presence of litharge.

4. In the process of producing resins from oils containing polymerizable constituents of the coumarone-indene type, the step which comprises refluxing the oil with about 5% or less of litharge.

5. In the process of producing resins from crude coal tar naphtha containing polymerizable constituents of the coumarone-indene type, the step which comprises refluxing the crude naphtha for about one hour with about 3% of litharge.

6. The method of obtaining light colored resins from oil containing polymerizable constituents obtainable by the distillation of coal comprising heating the oil with litharge, separating the treated oil from the litharge and polymerizing constituents of the treated oil.

7. The method of obtaining light colored resins from crude coal tar naphtha containing polymerizable constituents of the coumarone-indene type comprising refluxing the crude naphtha with litharge, separating the treated naphtha from the litharge and polymerizing constituents of the treated naphtha.

8. The method of obtaining light colored resins from oils containing organic polymerizable constituents comprising heating the oil with litharge, separating the treated oil from the litharge, distilling the treated oil and polymerizing constituents of the distillate thus obtained.

9. The method of obtaining light colored resins from crude coal tar naphtha containing polymerizable constituents of the coumarone-indene type comprising refluxing the crude naphtha in the presence of litharge, separating the treated naphtha from the litharge, distilling the treated naphtha, and polymerizing constituents of the distillate thus obtained.

10. The method of obtaining light colored resins from crude coal tar naphtha containing polymerizable constituents of the coumarone-indene type comprising refluxing the crude naphtha in the presence of litharge separating the treated naphtha from the litharge, distilling the treated naphtha, collecting the distillate coming over at temperatures not exceeding about 210° C., and polymerizing constituents of the distillate thus obtained.

11. The method of obtaining light colored resins from crude coal tar naphtha containing polymerizable constituents of the coumarone-indene type comprising refluxing the naphtha with about 5% or less of litharge, separating the naphtha from the litharge, distilling the treated naphtha, collecting the distillate coming over at a temperature up to about 200° C. and polymerizing constituents of the distillate thus obtained.

12. The method of obtaining light colored resins from crude coal tar naphthas which comprises refluxing crude naphtha having a boiling point range within the limits of about 135° to 230° C. with about 3% of litharge for a period of about one hour, separating the litharge from the treated naphtha, distilling the naphtha, collecting the distillate coming over at temperatures up to about 200° C. and polymerizing constituents of the distillate thus produced.

13. The method of obtaining light colored resins from oil containing organic constituents polymerizable by treatment with concentrated sulfuric acid comprising heating the oil with litharge, separating the treated oil from the litharge and polymerizing constituents of the treated oil by treatment with concentrated sulfuric acid.

14. The method of obtaining light colored resins from crude coal tar naphthas containing polymerizable constituents of the coumarone-indene type comprising refluxing the crude naphtha with litharge, separating the treated naphtha from the litharge and polymerizing constituents of the treated naphtha by treatment with 66° Bé. sulfuric acid at temperatures below about 20° C.

15. The method of obtaining light colored resins from naphtha containing polymerizable constituents of the coumarone-indene type comprising refluxing the naphtha with litharge, separating the naphtha from the litharge, diluting the treated naphtha with refined naphtha containing substantially no polymerizable constituents and polymerizing constituents of the diluted product.

16. The process as set forth in claim 8 in which the distillation of the treated oil is carried out in the presence of an alkaline material.

17. The process as set forth in claim 9 in which the distillation of the treated naphtha is carried out in the presence of an alkali.

18. The process as described in claim 11 in which a small amount of 20% caustic soda solution is added to the treated naphtha prior to distillation thereof.

19. The method of producing light colored resins from oil containing tar acids and polymerizable constituents of the coumarone-indene type which comprises refluxing the oil with litharge, separating the oil from the litharge, removing tar acids from the treated oil with caustic soda, separating the treated oil and polymerizing constituents thereof to obtain a light colored resin.

20. The method of producing light colored resins which comprises refluxing crude coal tar naphtha having a boiling point range within the limits of about 135° C. and 230° C. with about 3% litharge for about one hour, separating the treated naphtha from the litharge, adding about 2.6% by weight of a 20% solution of caustic soda to the treated naphtha, distilling the naphtha in the presence of the caustic soda, collecting the distillate coming over at temperatures not exceeding about 210° C., diluting the distillate with about one-half its volume of refined naphtha from which polymerizable constituents have been removed and polymerizing constituents of the diluted product thus obtained with sulfuric acid at temperatures not exceeding about 20° C.

21. The method of obtaining light colored resins from oil containing polymerizable constituents of the coumarone-indene type which comprises heating the oil with litharge, separating the oil from the litharge, subjecting the oil separated to further treatment to remove or modify resin darkening constituents of the oil and polymerizing the oil to obtain light colored resin therefrom.

22. The method of obtaining light colored resins from oils containing polymerizable constituents obtainable by the distillation of coal comprising heating the oil with litharge, distilling the treated oil under reduced pressure and polymerizing constituents of the distillate thus obtained.

23. The method of obtaining light colored resins from crude coal tar naphtha containing polymerizable constituents of the coumarone-indene type comprising refluxing the crude naphtha in the presence of litharge, separating the treated naphtha from the litharge, distilling the treated naphtha under a vacuum of 24 inches of mercury until the vapor temperature is about 145° C., and polymerizing constituents of the distillate thus obtained.

24. The method of obtaining light colored resins from crude coal tar naphtha containing polymerizable constituents comprising separating tar acids and pyridine bases from the naphtha heating the naphtha with litharge, separating the treated naphtha from the litharge and polymerizing constituents of the treated naphtha.

EDWIN L. CLINE.